(12) United States Patent
Boethel et al.

(10) Patent No.: US 10,239,505 B2
(45) Date of Patent: Mar. 26, 2019

(54) METHOD AND DEVICE FOR ELECTRONICALLY CONTROLLING A VEHICLE DECELERATION IN AN ABS BRAKING SYSTEM

(71) Applicant: WABCO GmbH, Hannover (DE)

(72) Inventors: Andreas Boethel, Harsum (DE); Horst Eckert, Rehburg-Loccum (DE); Torsten Wallbaum, Duingen (DE)

(73) Assignee: WABCO GMBH, Hannover (DE)

( * ) Notice: Subject to any disclaimer, the term of this patent is extended or adjusted under 35 U.S.C. 154(b) by 0 days.

(21) Appl. No.: 15/559,063

(22) PCT Filed: May 12, 2016

(86) PCT No.: PCT/EP2016/000771
§ 371 (c)(1),
(2) Date: Sep. 18, 2017

(87) PCT Pub. No.: WO2016/188612
PCT Pub. Date: Dec. 1, 2016

(65) Prior Publication Data
US 2018/0072288 A1 Mar. 15, 2018

(30) Foreign Application Priority Data
May 23, 2015 (DE) .......... 10 2015 006 737

(51) Int. Cl.
*G06F 7/70* (2006.01)
*B60T 8/17* (2006.01)
(Continued)

(52) U.S. Cl.
CPC .......... *B60T 8/1708* (2013.01); *B60T 8/1766* (2013.01); *B60T 8/268* (2013.01); *B60T 8/327* (2013.01);
(Continued)

(58) Field of Classification Search
CPC ...... B60T 8/1708; B60T 8/1766; B60T 8/268; B60T 8/327
See application file for complete search history.

(56) References Cited

U.S. PATENT DOCUMENTS 5,011,236 A  4/1991  Toepfer et al.
5,470,136 A *  11/1995  Tozu ..................... B60T 8/1755
                                        303/113.4
(Continued)

FOREIGN PATENT DOCUMENTS

DE  3829951 A1  3/1990
DE  10137148 A1  2/2003
(Continued)

*Primary Examiner* — Adam M Alharbi
(74) *Attorney, Agent, or Firm* — Leydig, Voit & Mayer, Ltd.

(57) ABSTRACT

A method for controlling a vehicle deceleration in a vehicle with an ABS brake system. The method includes detecting a target vehicle deceleration specified by a driver; defining a maximum deceleration and a minimum deceleration, each depending on the detected target vehicle deceleration; detecting an actual vehicle deceleration; and controlling a braking pressure on wheel brakes of a first vehicle axle and a second vehicle axle depending on the detected actual vehicle deceleration by actuation of ABS brake valves. Controlling the braking pressure by the actuation of the ABS brake valves comprises controlling the braking pressure on the wheel brakes of the second vehicle axle depending on a detected actual differential slip if the actual vehicle deceleration is less than the maximum deceleration and greater than the minimum deceleration, wherein the actual differential slip indicates the difference in a rotational behavior of the first vehicle axle.

18 Claims, 6 Drawing Sheets

(51) Int. Cl.
    *B60T 8/1766*    (2006.01)
    *B60T 8/26*      (2006.01)
    *B60T 8/32*      (2006.01)
    *B60T 13/10*     (2006.01)
    B60T 13/58     (2006.01)
    B60T 15/02     (2006.01)

(52) U.S. Cl.
    CPC ............ B60T 13/10 (2013.01); *B60T 13/585* (2013.01); *B60T 15/025* (2013.01)

(56) References Cited

U.S. PATENT DOCUMENTS

| | | | |
|---|---|---|---|
| 5,505,532 A * | 4/1996 | Tozu | B60T 8/1766 303/165 |
| 6,834,221 B2 * | 12/2004 | Jager | B60K 28/16 701/30.3 |
| 2005/0001477 A1 | 1/2005 | Mederer et al. | |
| 2009/0134698 A1 | 5/2009 | Herges | |
| 2013/0332043 A1 | 12/2013 | Svensson et al. | |
| 2015/0046057 A1 | 2/2015 | Lauser et al. | |

FOREIGN PATENT DOCUMENTS

| | | |
|---|---|---|
| DE | 102006045317 A1 | 5/2007 |
| DE | 102006032064 A1 | 1/2008 |
| DE | 102008009948 B3 | 10/2009 |
| DE | 102009021685 A1 | 11/2010 |
| DE | 102011017018 B3 | 7/2012 |
| DE | 102011118130 B4 | 8/2013 |
| DE | 102013207127 A1 | 12/2013 |

\* cited by examiner

METHOD AND DEVICE FOR ELECTRONICALLY CONTROLLING A VEHICLE DECELERATION IN AN ABS BRAKING SYSTEM

CROSS REFERENCE TO RELATED APPLICATIONS

This application is a U.S. National Stage Application under 35 U.S.C. § 371 of International Application No. PCT/EP2016/000771 filed on May 12, 2016, and claims benefit to German Patent Application No. DE 10 2015 006 737.0 filed on May 23, 2015. The International Application was published in German on Dec. 1, 2016 as WO 2016/188612 A1 under PCT Article 21(2).

FIELD

The invention concerns a method for electronically controlling a vehicle deceleration in an ABS brake system, in particular in a utility vehicle, by adjusting braking pressures on a first and on a second vehicle axle to be controlled depending on a current actual vehicle deceleration and on a detected actual differential slip, and a device for carrying out the method.

BACKGROUND

In utility vehicles, a braking pressure controller that limits the braking pressure (electronic brake force limiter, EBL) is used in particular to distribute the desired braking effect of a brake system or a driver to the vehicle axles in a suitable manner, so that the vehicle is decelerated according to a driver's wishes or a target vehicle deceleration specified by a driver and at the same time remains stable depending on the driving situation. This is because in the event of hard braking, i.e. in the case of a high target vehicle deceleration, the weight of the vehicle is displaced to the front axle, so that the rear wheels on the rear axle are pressed less strongly onto the ground, whereby locking of the rear wheels is assisted.

By limiting the braking pressure on wheel brakes of the rear wheels, premature locking of the rear wheels during braking can be avoided. The limiting of the braking pressure can be carried out depending on an axle loading, because in the case of vehicles that are heavily loaded more braking force can be applied to the road by means of the rear axle than with unladen vehicles, in which excessive braking of the rear wheels amplifies the effect described above still further; the tendency to locking of the rear wheels increases.

For measuring the load in the case of spring suspension vehicles, a mechanical displacement sensor can be provided that is deflected to a greater or lesser extent depending on the load. In the case of pneumatic suspension vehicles, a pressure sensor that measures the pressure in a supporting bellows can be used for this. Depending on the load-dependent measurement signal, the weight can be concluded and limiting of the braking pressure can be carried out depending thereon.

In vehicles without such a mechanical displacement sensor or pressure sensor, in which no direct measurement of the load is provided, electronic braking pressure limiting can be provided. In this case, control of the braking pressure on the wheel brakes of the rear wheels is carried out depending on a difference between a wheel revolution rate of the front wheels and the wheel revolution rate of the rear wheels, or depending on the difference between a brake slip of the front wheels and the brake slip of the rear wheels. Because the difference in the wheel revolution rates or the brake slips is load-dependent, the braking pressure is distributed accordingly to the vehicle axles to prevent the wheels of the rear axle from prematurely showing a tendency to lock and in order to decelerate the vehicle as desired.

DE 10 2008 009 948 B3 discloses an electronic braking pressure controller, with which the braking pressure on the wheel brakes is controlled depending on an axle load sensor and the target vehicle deceleration. In the event of a failure of the axle load sensor, control of the braking pressure is carried out depending on the difference of the brake slips on the vehicle axles, i.e. depending on a measured actual differential slip.

DE 10 2011 118 130 B4 also discloses an electronic braking pressure controller, with which the braking forces are distributed depending on a determined actual differential slip or a determined speed difference of the wheels on the vehicle axles in order to decelerate the vehicle as desired. During this, the braking pressure on the wheel brakes of the rear wheels is limited if the actual differential slip exceeds a target differential slip. In this case, the target differential slip is a function of the target vehicle deceleration, wherein the target differential slip increases at higher target vehicle decelerations in order to guarantee a more sensitive transition to ABS control, which is more likely to intervene in this case rather than in the case of a constant target brake slip. It is disadvantageous in this case that an increase in the target differential slip in the case of a high target vehicle deceleration causes early actuation of the ABS controller, whereby the braking behavior is less smooth and less safe, because ABS control must intervene sooner.

In DE 10 2006 045 317 A1, an electronic braking force distribution is disclosed, with which the braking forces are distributed to the vehicle axles as a function of the vehicle deceleration instead of as a function of the differential slip. For this purpose, it is provided to measure an actual vehicle deceleration and to control the braking pressure on the rear axle on reaching a maximum deceleration, i.e. a defined threshold value for the actual vehicle deceleration. In this case, the maximum deceleration is defined in such a way that from said value the rear wheels tend to lock more than the front wheels. Thus, a tendency to locking of the rear wheels is matched to the tendency to locking of the front wheels. After exceeding the maximum deceleration, it is provided to build up the braking pressure on the wheel brakes of the rear wheels in a controlled manner, wherein the gradient is smaller than the gradient of the braking pressure that is building up on the wheel brakes of the front wheels. As a result, the braking pressure on the wheel brakes of the rear axle tracks the braking pressure on the wheel brakes of the front wheels, i.e. in order to remain lower by a defined value. It is disadvantageous in this case that above the maximum deceleration the braking behavior acts in an unsettled manner overall owing to the adjustment and is perceived as unpleasant.

SUMMARY

In an embodiment, the present invention provides a method for controlling a vehicle deceleration in a vehicle with an ABS brake system. The method includes detecting a target vehicle deceleration specified by a driver; defining a maximum deceleration and a minimum deceleration, each depending on the detected target vehicle deceleration; detecting an actual vehicle deceleration; and controlling a braking pressure on wheel brakes of a first vehicle axle and a second vehicle axle depending on the detected actual vehicle deceleration by actuation of ABS brake valves. Controlling the braking pressure by the actuation of the ABS brake valves comprises: increasing the braking pressure on the wheel brakes of the first vehicle axle and the second vehicle axle if the actual vehicle deceleration is less than the minimum deceleration in order to achieve a minimum braking effect; limiting the braking pressure on the wheel brakes of the first vehicle axle and the and the second vehicle axle if the actual vehicle deceleration is greater than the maximum deceleration in order to limit a braking effect; and additionally controlling the braking pressure on the wheel brakes of the second vehicle axle depending on a detected actual differential slip if the actual vehicle deceleration is less than the maximum deceleration and greater than the minimum deceleration, wherein the actual differential slip indicates the difference in a rotational behavior of the first vehicle axle with respect to the second vehicle axle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
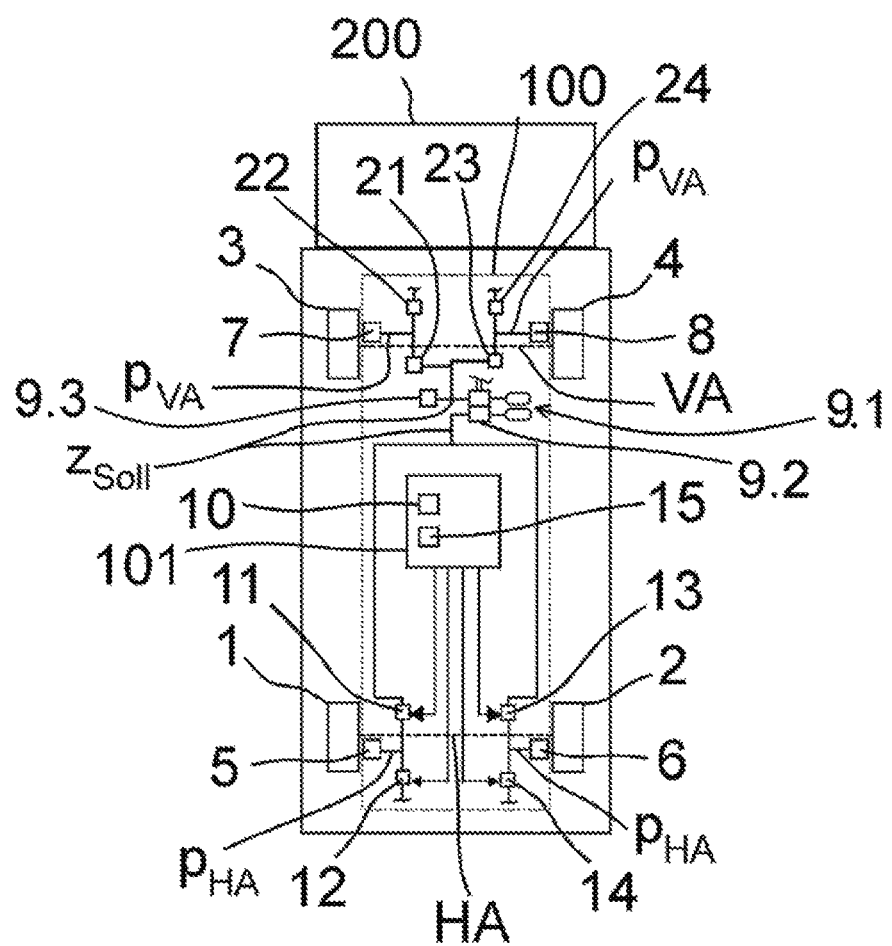
FIG. 1 shows a vehicle with an electronic brake system as a block diagram.

Embodiments of the invention provide methods and devices for electronically controlling a vehicle deceleration in an ABS brake system that guarantees pleasant and safe braking with smooth braking behavior.

Embodiments of the invention provide for controlling a braking pressure on wheel brakes of a first vehicle axle, for example of a front axle of a vehicle, and of a second vehicle axle, e.g. of a rear axle of the vehicle, depending on a detected actual vehicle deceleration, i.e. on an actual negative acceleration of the vehicle, wherein the braking pressure on the wheel brakes of the first and the second vehicle axles is limited if the actual vehicle deceleration exceeds a maximum deceleration, and the braking pressure on the wheel brakes of the first and the second vehicle axles is increased if the actual vehicle deceleration is less than a minimum deceleration. In this case, limiting means that the braking pressure on the wheel brakes of the two vehicle axles to be controlled may not be increased further, i.e. the braking pressure can be maintained at the current value or even reduced to a lower value depending on the driver's wishes.

Furthermore, embodiments of the invention provide that the braking pressure on the wheel brakes of the second vehicle axle is additionally controlled depending on a detected actual differential slip if the actual vehicle deceleration is less than the maximum deceleration and greater than the minimum deceleration, wherein the actual differential slip specifies a difference between a current rotational behavior of the second vehicle axle and that of a further vehicle axle, for example the first vehicle axle.

A method for controlling the vehicle deceleration (vehicle deceleration control) by adjusting the braking pressures on the wheel brakes of the first and the second vehicle axles is thus provided in accordance with an embodiment of the invention, wherein control intervention is made in the first and the second vehicle axles, taking into account the maximum and the minimum deceleration, and in the second vehicle axle additionally taking into account the actual differential slip. As a result, the control behavior in the vehicle can advantageously be smoothed, because after reaching the maximum deceleration further control interventions, for example by the differential slip controller, are inhibited.

The actual vehicle deceleration in this case is for example determined by an acceleration sensor or from the derivative of a vehicle reference speed that is determined by means of wheel revolution rate sensors. In this case, it can be taken into account whether the vehicle is already decelerating without actuation of the brakes, for example by rolling resistance and air resistance, a highway gradient or a retarder in the vehicle. In this case, the method is based on a difference of a measured actual vehicle deceleration and a corresponding offset vehicle deceleration.

The maximum deceleration and the minimum deceleration are in particular dependent upon a target vehicle deceleration that is specified by the driver, so that a maximum deceleration characteristic and a minimum deceleration characteristic result. In this case, the target vehicle deceleration can for example be determined by a braking value transducer, i.e. a displacement sensor, that detects the actuation travel of a brake valve or a brake pedal actuated by the driver, or a pressure sensor that detects a braking pressure adjusted by the driver with a brake valve. From the characteristic curves, in the case of a detected target vehicle deceleration the value of the maximum deceleration or the minimum deceleration can be determined and can form the basis for the subsequent vehicle deceleration control. During this, the maximum deceleration characteristic profile is, for example, constant or advantageously harmonic, i.e. rises smoothly without steps, depending on the target vehicle deceleration, for example.

As a result, a pleasant brake feel and improved braking pressure smoothness can advantageously be achieved. This is because by limiting the braking pressure on the wheel brakes of the first and second vehicle axles to the harmonically varying maximum deceleration characteristic depending on the target vehicle deceleration, which is also referred to as the Feeling graph, the braking force is limited on the two vehicle axles to be controlled in such a way that an actual vehicle deceleration resulting therefrom is perceived by the driver as pleasant. The profile of the Feeling graph also enables improved braking pressure smoothness, because the braking pressure can be controlled more sensitively depending on the target vehicle deceleration, i.e. on the driver's wishes.

If the actual vehicle deceleration is greater than or equal to the maximum deceleration and the driver increases the target vehicle deceleration by an additional operation of the brake pedal or a brake valve, i.e. a braking process is occurring, a stronger deceleration of the vehicle only then takes place if there is a further vehicle axle that is not controlled by the method, the wheel brakes of which are then actuated accordingly, unless the actual vehicle deceleration is again less than the maximum deceleration owing to this. If the actual vehicle deceleration is greater than or equal to the maximum deceleration and the driver reduces the target vehicle deceleration, for example by releasing the brake pedal, i.e. there is a slowing down process, the braking pressure can advantageously also be reduced to adjust the actual vehicle deceleration faster to the maximum deceleration.

The maximum deceleration is determined depending on the target vehicle deceleration, in particular in such a way that braking by the two vehicle axles to be controlled that is effectively unnecessary can be avoided by limiting the braking pressure of said vehicle axles to a value that is the maximum required to decelerate the vehicle according to the target vehicle deceleration specified by the driver. In this case, in particular the braking effect that can be achieved by the uncontrolled further vehicle axles that may be in the vehicle is taken into account.

The maximum deceleration characteristic is preferably extended by an upper tolerance and a lower tolerance to advantageously take into account a minimum actuation time or pulse duration of the brake valves in the brake system. This is because triggering the control of the braking pressures or control of the actual vehicle deceleration to the maximum deceleration characteristic is limited by the actuation time of the brake valves.

In order to guarantee pleasant and safe braking, even in the case of different load states of the vehicle, the maximum deceleration is preferably load-dependent and dependent on the target vehicle deceleration. Therefore, the maximum deceleration characteristic profile is flatter for a heavy load and steeper for a light load, i.e. rises faster, so that the braking pressure on the wheel brakes of the two vehicle axles to be controlled for higher load is already maintained for a lower actual vehicle deceleration than for a lighter load. As a result, the driver can advantageously be informed of the load state of the vehicle by the controlled braking effect, since the vehicle is decelerated faster with a light load than for a high load for the same target vehicle deceleration.

If the actual vehicle deceleration is less than the minimum deceleration, braking force limiting on the two vehicle axles to be controlled is advantageously terminated or blocked in order to ensure that a minimum deceleration is not prevented, for example in order to satisfy requirements regarding a legally required minimum braking effect depending on the target vehicle deceleration; which increases safety.

The braking pressure on the two vehicle axles to be controlled can both be increased and also maintained by the vehicle deceleration control according to embodiments of the invention if the actual vehicle deceleration is less than the maximum deceleration and greater than the minimum deceleration. On the first vehicle axle, the braking pressure can additionally also be reduced.

In said region, during a braking process the braking pressure on the wheel brakes of the first vehicle axle is preferably only maintained or increased, and during a slowing down process is only maintained or reduced, in order to advantageously achieve slowing down of the vehicle with only a few control interventions. In this case, the term braking process means that the actual vehicle deceleration increases, and the term slowing down process means that the actual vehicle deceleration decreases.

In addition, it can be provided that the braking pressure during a braking process is only maintained or increased if the driver also increases the target vehicle deceleration by a harder operation of the brake pedal or the brake valve and during a slowing down process is only maintained or reduced if the driver also releases the brake pedal and thereby actively reduces the target vehicle deceleration. This has a positive effect on the brake feel of the driver, because he receives a corresponding response from the vehicle when operating the brake pedal and the adjustment of the braking pressure is not even carried out if the actual vehicle deceleration increases or decreases with a varying gradient, for example. In addition, it can also be provided that initial overbraking during a braking process can be compensated by a pressure reduction and initial underbraking can be compensated during a slowing down process by increasing the pressure.

In order to improve the smoothness of the braking pressure, during a transition from a braking process to a slowing down process or from a slowing down process to a braking process, a time period for reducing or increasing the braking pressures on the wheel brakes of the two vehicle axles to be controlled can be extended in order in particular to overcome hysteresis behavior during the reversal of the direction of the braking effect on the wheel brakes.

In particular, in the region between the maximum deceleration and the minimum deceleration the inventive control of the vehicle deceleration additionally takes place depending on the differential slip (differential slip control, DSC), preferably between the first and the second vehicle axle, by virtue of the fact that the braking pressure on the second vehicle axle is correspondingly adjusted.

For this purpose, an actual differential slip is determined, i.e. a difference between a current rotational behavior of the second vehicle axle, for example the rear axle, and the first vehicle axle, for example the front axle. The rotational behavior is characterized by a brake slip or a rotation rate of the wheels of the corresponding vehicle axle. The actual differential slip thus indicates the extent to which the second vehicle axle is underbraked or overbraked in relation to the first vehicle axle. In this case, overbraking means that the second vehicle axle is turning slower relative to the first vehicle axle, i.e. in particular has a greater brake slip, whereas underbraking means that the second vehicle axle has a smaller brake slip than the first vehicle axle, i.e. is turning faster.

The actual differential slip is preferably proportional to a difference of the brake slip of the rear axle that is driven by an engine minus the brake slip of the front axle, preferably normalized to the brake slip of the driven rear axle. However, the method of calculation is not limited to this; for example, depending on the rotation rate of the vehicle axles, the actual differential slip can also be determined from the difference of the rotation rate of the front axle minus the rotation rate of the driven rear axle, preferably normalized to the rotation rate of the front axle. Other methods of calculation are also conceivable.

The differential slip control adjusts the actual differential slip to a target differential slip in that the braking pressure on the second vehicle axle is limited, i.e. preferably maintained, in order to avoid overbraking, and increased in order to avoid underbraking of the second vehicle axle; the tendency of the second vehicle axle to lock is therefore approximated to the tendency of the first vehicle axle to lock. For this purpose, the actual differential slip and the target differential slip are compared, and the braking pressure on the second vehicle axle is adjusted correspondingly in the case of deviation. For this purpose, in unclocked brake valves a tolerance above and/or below the target differential slip can advantageously be provided in order to smooth the control behavior.

The differential slip control in this case is also subject to the requirement that the braking pressure on the wheel brakes of the second vehicle axle is limited if the actual vehicle deceleration is greater than the maximum deceleration, for example owing to the differential slip control, and is increased if it is lower than the minimum deceleration. In the case in which the actual vehicle deceleration is lower than the minimum deceleration, the differential slip control is interrupted in a pulsed manner; control depending on the actual differential slip is then no longer enabled for safety reasons. Limiting the braking pressure on exceeding the maximum deceleration by the actual vehicle deceleration is advantageously used for smoothing of the deceleration profile as fewer control interventions occur. This is in particular the case if the braking pressure is also not reduced during the limiting, i.e. is maintained by the control.

Advantageously however, the braking pressure on the second vehicle axle can also be reduced by the differential slip control if the actual vehicle deceleration is greater than the maximum deceleration and the second vehicle axle is overbraked. Owing to this, the actual vehicle deceleration advantageously reduces faster to the maximum deceleration and the overbraking of the second vehicle axle decreases at the same time; furthermore, safety and braking comfort increase.

By means methods according to embodiments of the invention, the vehicle deceleration is therefore advantageously adjusted to the maximum deceleration characteristic curve, as a result of which a pleasant braking effect can be achieved and at the same time the brake slip values of the two axles can be adapted to one another, with the result that the driving comfort and also the safety increase.

The target differential slip to which the differential slip control adjusts the actual differential slip may be, for example, constant and can be determined at the start of a braking operation, i.e. when braking forces are not yet acting, in order to obtain an offset differential slip which takes into account an engine drag torque, wear of the wheels and, if appropriate, properties of the underlying surface. In the case of the abovementioned calculation method, the offset differential slip is greater than zero here, since the driven rear axle rotates more slowly, as a result of an engine drag torque, than the entrained front axle.

The target differential slip can advantageously also be dependent on the actual vehicle deceleration or the target vehicle deceleration. For example, in the case of an increasing actual vehicle deceleration or target vehicle deceleration the target differential slip can fall from the offset differential slip in the direction of zero, i.e. in the direction of a synchronous wheel rotational behavior of the wheels of the first and second vehicle axles, in such a way that in the event of the second vehicle axle being the rear axle and the first vehicle axle being the front axle, locking of the loadable rear axle is counteracted. If the actual differential slip determined according to the above method of calculation is greater than the target differential slip here, the rear axle is overbraked relative to the front axle, i.e. the rear axle braking pressure is limited. If on the other hand the actual differential slip is less than the target differential slip, the rear axle is underbraked relative to the front axle, i.e. the rear axle braking pressure is increased. Thus, the rear axle braking pressure is already limited owing to the target differential slip decreasing with increasing actual vehicle deceleration or target vehicle deceleration in the case of lower actual differential slip, i.e. in the case of lower relative overbraking.

This advantageously takes into account that in the case of a high actual vehicle deceleration or high target vehicle deceleration the loadable rear axle has a tendency to slip, i.e. is underbraked, and therefore according to the above calculation method an actual differential slip which has a tendency to be higher is present, which is amplified further in the non-loaded state. If the target differential slip shifts to lower values in the case of a rising actual vehicle deceleration or target vehicle deceleration, the rear axle braking pressure is already limited in the case of a lower actual differential slip, i.e. in the case of lower relative overbraking; premature intervention by the overlaid ABS control can be prevented; the driving behavior is thereby smoother and safer overall.

According to an alternative embodiment, in which the front axle is the second vehicle axle and the rear axle is the first vehicle axle, for example in the case of a utility vehicle with a greater load on the rear axle, for example a bus, the front axle is pressed less heavily onto the road and thus tends more to start to slip, wherein as a result according to the above method of calculation the actual differential slip tends to be smaller starting from the offset differential slip. If in this case the actual differential slip determined according to the above method of calculation is greater than the target differential slip, the front axle is underbraked relative to the rear axle, i.e. the front axle braking pressure is increased. If on the other hand the actual differential slip is smaller than the target differential slip, the front axle is overbraked relative to the rear axle, i.e. the rear axle braking pressure is limited. The target differential slip decreasing towards zero from the offset differential slip thus ensures that premature intervention of the overlaid ABS control on the front axle can be avoided by already limiting the braking pressure at lower relative overbraking; the driving behavior is thus smoother and safer overall.

A vehicle load can advantageously be determined from the actual differential slip. If the vehicle is not loaded, i.e. a low weight force is acting on the rear axle, the rear wheels tend more to lock for a given brake actuation or for a predetermined target vehicle deceleration than for a fully loaded vehicle with greater weight on the rear axle. The actual differential slip thus varies depending on the load of the vehicle for a predetermined target vehicle deceleration. A load on the vehicle can thus be concluded from the actual differential slip, and distribution of the braking forces on the vehicle axles depending on the load can be achieved indirectly by the differential slip control.

The vehicle is preferably a utility vehicle in which the weight on the rear axle changes to a greater extent relative to the front axle between a loaded state and a non-loaded state. In this case, the second vehicle axle which is to be controlled by the braking pressure control according to embodiments of the invention is advantageously the rear axle of the vehicle. In addition, a second rear axle can also be controlled in the same way. If the utility vehicle is, for example, a bus, an inverted load state of the vehicle axles correspondingly occurs.

For controlling the vehicle deceleration by adjusting the corresponding braking pressures on the wheel brakes of the two vehicle axles to be controlled, a device according to an embodiment of the invention, for example a VD control device (vehicle deceleration control device), controls ABS brake valves, i.e. inlet valves implemented as 2/2-solenoid valves, and outlet valves on the wheel brakes of the two vehicle axles to be controlled in such a way that a braking pressure on the vehicle axle to be controlled is either maintained or increased. In addition, the VD control device can also optionally reduce the braking pressure on both vehicle axles to be controlled by venting in order to remove or reduce the braking force.

In this case, the ABS brake valves are part of an anti-lock brake system (ABS) present in the vehicle to control the brake slip on the individual wheels. The ABS brake valves can be actuated both by an ABS control device and also by the VD control device. However, the ABS control device has priority over the VD control device, so that on detecting an excessive brake slip on one of the wheels of the two vehicle axles to be controlled, conventional ABS control is carried out by the ABS control device and the vehicle deceleration control by the VD control device according to the invention is inhibited.

Various load-dependent maximum deceleration characteristics, on which the vehicle deceleration control is based depending on the load on the vehicle, can preferably be stored in the VD control device. The load state, depending on which the maximum deceleration characteristic is selected, can for example be derived from the differential slip control described above, i.e. from the load-dependent actual differential slip. However, it is also possible to use an arbitrary axle load sensor to determine the load state, which measures either a displacement between for example a frame of the vehicle and the loaded vehicle axle or a pressure acting on the vehicle axle that can be loaded or a supporting bellows on the vehicle axle that can be loaded by means of a pressure sensor, from which a load state can be concluded by the VD control device.

The load information can also be transmitted via a CAN bus from an ECAS system to the VD control device, which controls the pneumatic suspension of the vehicle electronically depending on an axle loading. Moreover, the VD control device can determine a current mass of the vehicle from information about the current engine power and the resulting vehicle acceleration, from which a load can be concluded with knowledge of the unladen mass of the vehicle. Furthermore, the presence of a trailer can also be taken into account during the determination of the load or during the selection of the maximum deceleration characteristic, it being possible for said trailer to form a proportion of the determined mass of the vehicle, wherein said information can be provided to the VD control device via the CAN bus by a trailer control device for example.

FIG. 1 shows a vehicle 200 with a brake system 100 with the components that are relevant here. Therefore, a rear axle HA with rear wheels 1, 2 is provided as the second vehicle axle and a front axle VA with front wheels 3, 4 is provided as a first vehicle axle. The rear wheels 1, 2 can be braked by means of rear wheel brakes 5, 6 and the front wheels 3, 4 can be braked by means of front wheel brakes 7, 8 by transferring a braking pressure p provided by means of brake cylinders 9.1 via a dual circuit brake valve 9.2 to the rear wheel brakes 5, 6 or the front wheel brakes 7, 8 depending on a target vehicle deceleration $z_{Soll}$ that is specified by the driver. In this case, the target vehicle deceleration $z_{Soll}$ can for example be detected by a pressure sensor 9.3 acting as a braking value transducer that detects a braking pressure controlled by the driver via the brake valve 9.2, according to FIG. 1 by way of example a front axle braking pressure $p_{VA}$. The brake system 100 can be an electrohydraulic or electropneumatic brake system, i.e. a liquid pressure or an air pressure is controlled. The brake system 100 is electrically controlled, in particular by an EBS control device 101.

For brake slip-controlled deceleration, the brake system 100 comprises an anti-lock brake system (ABS) with an ABS control device 10 that actuates ABS brake valves 11, 12, 13, 14, 21, 22, 23, 24 in a pulsed manner depending on a detected brake slip. According to said embodiment, the ABS control device 10 is integrated within the EBS control device 101.

The ABS brake valves 11, 12, 13, 14 on the rear wheel brakes 5, 6 and the ABS brake valves 21, 22, 23, 24 on the front wheel brakes 7, 8 are each implemented as 2/2-solenoid valves, wherein an inlet valve 11, 13, 21, 23 and an outlet valve 12, 14, 22, 24 are provided for each wheel brake 5, 6, 7, 8. If the inlet valves 11, 13 are opened and the outlet valves 12, 14 are shut off, the rear wheel brakes 5, 6 are subjected to a rear axle braking pressure $p_{HA}$ controlled by the brake valve 9.2 and thus corresponding braking is effected by the rear axle HA. If on the other hand the inlet valves 11, 13 are shut off and the outlet valves 12, 14 are opened, the rear wheel brakes 5, 6 are vented and thus the braking effect by the rear axle HA is reduced. If both the inlet valves 11, 13 and the outlet valves 12, 14 are shut off, a rear axle braking pressure $p_{HA}$ acting on the rear wheel brakes 5, 6 is maintained. The same applies to the ABS brake valves 21, 22, 23, 24 on the front wheel brakes 7, 8, by the adjustment of which the front axle braking pressure $p_{VA}$ is controlled.

In the context of the exemplary embodiment, there is no distinction between the left and the right rear wheel brake 5, 6 in relation to the braking pressure or the braking effect, i.e. both rear wheel brakes 5, 6 are subjected to the same rear axle braking pressure $p_{HA}$ in order to achieve a braking effect corresponding to the target vehicle deceleration $z_{Soll}$ together with the front wheel brakes 7, 8, on each of which the front axle braking pressure $p_{VA}$ acts. It is however also possible to control the ABS brake valves 11, 12, 13, 14, 21, 22, 23, 24 of the individual wheel brakes 5, 6, 7, 8 independently of each other, so that there can be different braking pressures on each of the wheel brake 5, 6, 7, 8.

According to embodiments of the invention, in addition to the ABS control, electronic control of the vehicle deceleration (vehicle deceleration control) is also provided that controls the front axle braking pressure $p_{VA}$ and the rear axle braking pressure $p_{HA}$ in such a way that a determined actual vehicle deceleration $z_{Ist}$ that is dependent on the target vehicle deceleration $z_{Soll}$, i.e. a negative acceleration, is set in the vehicle 200. In this case, the rear axle braking pressure $p_{HA}$ is additionally controlled depending on a detected actual differential slip $DS_{Ist}$.

The vehicle deceleration control is controlled by a VD control device 15, which according to said embodiment is integrated within the EBS control device 101 and is implemented to actuate the ABS brake valves 11, 12, 13, 14 on the rear wheel brakes 5, 6 and the ABS brake valves 21, 22, 23, 24 on the front wheel brakes 7, 8. However, the ABS control device 10 has priority over the VD control device 15 regarding the control of the ABS brake valves 11, 12, 13, 14, 21, 22, 23, 24. I.e., on detecting brake slip that is not allowed on one of the rear wheels 1, 2 or on one of the front wheels 3, 4, vehicle deceleration control that has already started is terminated and conventional ABS control is carried out by the ABS control device 10.

According to said embodiment, the vehicle deceleration control determines as follows at which actual vehicle decelerations zest the ABS brake valves 11, 12, 13, 14, 21, 22, 23, 24 are actuated, and as a result the vehicle 200 is decelerated depending on the target vehicle deceleration $z_{Soll}$:

A maximum deceleration characteristic $z_{Kmax}$ and a minimum deceleration characteristic $z_{Kmin}$ as functions of the target vehicle deceleration $z_{Soll}$ are stored in the VD control device 15, each of which constitutes determined dependencies of a maximum deceleration $z_{max}$ or a minimum deceleration $z_{min}$ on the target vehicle deceleration $z_{Soll}$. The maximum deceleration characteristic $z_{Kmax}$ can also be referred to as a Feeling graph that varies harmonically and as a result produces a pleasant brake feel for the driver.

Figure 2:
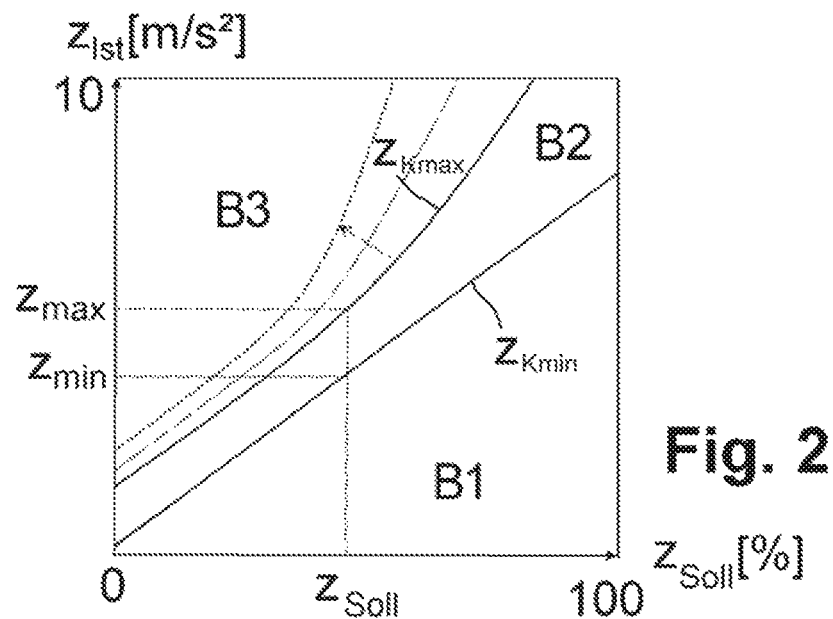
FIG. 2 shows a graph of the dependency of an actual vehicle deceleration on a target vehicle deceleration for defining control behavior.

According to FIG. 2, the target vehicle deceleration $z_{Soll}$ is plotted in a graph by way of example in percentage of the actuation of the brake valve 9.2 against the actual vehicle deceleration $z_{Ist}$ in m/s². The maximum deceleration characteristic $z_{Kmax}$ and the minimum deceleration characteristic $z_{Kmin}$ divide the diagram into three regions B1, B2, B3. A first region B1 lies between the x-axis ($z_{Soll}$) and the minimum deceleration characteristic $z_{Kmin}$, a second region B2 lies between the minimum deceleration characteristic $z_{Kmin}$ and the maximum deceleration characteristic $z_{Kmax}$ and a third region B3 lies above the maximum deceleration characteristic $z_{Kmax}$.

Said three regions B1, B2, B3 determine how the VD control device 15 can actuate the ABS brake valves 11, 12, 13, 14 on the rear wheel brakes 5, 6 and the ABS brake valves 21, 22, 23, 24 on the front wheel brakes 7, 8 and thereby the braking force or the rear axle braking pressure $p_{HA}$ or front axle braking pressure $p_{VA}$ that is controlled on the rear wheel brakes 5, 6 or front wheel brakes 7, 8 depending on the target vehicle deceleration $z_{Soll}$ and the actual vehicle deceleration $z_{Ist}$. The rear axle braking pressure $p_{HA}$ and the front axle braking pressure $p_{VA}$ are controlled depending on the three regions B1, B2, B3 as follows:

If a determined braking pressure $p_{HA}$, $p_{VA}$ is controlled at the wheel brakes 5, 6, 7, 8 by means of the brake valve 9.2 and thereby a target vehicle deceleration $z_{Soll}$ is demanded by the driver and the resulting actual vehicle deceleration $z_{Ist}$, which results from the braking of the front and the rear wheel brakes 5, 6, 7, 8, lies in the first region B1, the VD control device 15 causes opening of the inlet valves 11, 13, 21, 23 and closing of the outlet valves 12, 14, 22, 24 so that a build-up of pressure can be carried out both on the rear wheel brakes 5,6 and the front wheel brakes 7, 8 and an increasing deceleration by the rear wheels 1, 2 and the front wheels 3, 4 is enabled thereby.

The rear axle braking pressure $p_{HA}$ and the front axle braking pressure $p_{VA}$ are thus increased if the actual vehicle deceleration $z_{Ist}$ for a defined predetermined target vehicle deceleration $z_{Soll}$ is less than the minimum deceleration $z_{min}$ resulting from the minimum deceleration characteristic $z_{Kmin}$ for the target vehicle deceleration $z_{Soll}$. According to FIG. 2, by way of example it is indicated that a minimum deceleration $z_{min}$ and a maximum deceleration $z_{max}$ result from the y-values of the characteristic curves $z_{Kmin}$ and $z_{Kmax}$ for a defined target vehicle deceleration $z_{Soll}$ (x-value).

Said first region B1 is determined by the minimum deceleration characteristic $z_{Kmin}$, which for example can specify a legally specified minimum deceleration depending on the target vehicle deceleration $z_{Soll}$. I.e., below the minimum deceleration characteristic $z_{Kmin}$ a deceleration is forced for safety reasons—unless the higher-level ABS control intervenes.

If the actual vehicle deceleration $z_{Ist}$ for a defined target vehicle deceleration $z_{Soll}$ lies in the third region B3, i.e. the actual vehicle deceleration $z_{Ist}$ is greater than the maximum deceleration $z_{max}$ that results from the maximum deceleration characteristic $z_{Kmax}$ for the target vehicle deceleration $z_{Soll}$, the inlet valves 11, 13, 21, 23 and the outlet valves 12, 14, 22, 24 are actuated so that the rear axle braking pressure $p_{HA}$ and the front axle braking pressure $p_{VA}$ are limited.

Thus, it is not enabled that the rear axle braking pressure $p_{HA}$ and the front axle braking pressure $p_{VA}$ continue to increase if the target vehicle deceleration $z_{Soll}$ specified by the driver is increased; unless the actual vehicle deceleration $z_{Ist}$ is displaced into the first or second region B1, B2 again by the increasing target vehicle deceleration $z_{Soll}$. In the third region B3, the vehicle 200 can also only be more strongly decelerated by a further wheel brake of a vehicle axle that is not controlled, for example a second rear axle, in the braking behavior of which the vehicle deceleration control does not intervene.

The rear axle braking pressure $p_{HA}$ and the front axle braking pressure $p_{VA}$ and thus the braking force of the rear and front wheel brakes 5, 6, 7, 8 are also limited to a defined value, which is predetermined by the maximum deceleration characteristic $z_{Kmax}$, depending on the actual vehicle deceleration $z_{Ist}$. By controlling to said harmonically varying maximum deceleration characteristic $z_{Kmax}$, a pleasant brake feel for the driver can be achieved.

If the actual vehicle deceleration $z_{Ist}$ lies between the maximum deceleration characteristic $z_{Kmax}$ and the minimum deceleration characteristic $z_{Kmin}$, i.e. in the second region B2, an increase, reduction and also maintenance of the rear axle braking pressure $p_{HA}$ and the front axle braking pressure $p_{VA}$ are enabled to decelerate the vehicle 200.

In this case, in the second region B2 the actual vehicle deceleration $z_{Ist}$ is additionally controlled depending on the actual differential slip $DS_{Ist}$ by maintaining, reducing or increasing the rear axle braking pressure $p_{HA}$ depending on the level of an actually existing actual differential slip $DS_{Ist}$. Thus, a differential slip control (DSR) is carried out.

According to the embodiment, differential slip means the difference between the rotational behavior of the front wheels 3, 4 and the rotational behavior of the rear wheels 1, 2. According to said example, the rotational behavior is characterized by a front axle brake slip $DS_{VA}$ or a rear axle brake slip $DS_{HA}$, both of which result from the average value of the brake slips of the individual wheels 1, 2, 3, 4 of the respective vehicle axle VA, HA.

According to said embodiment, the actual differential slip $DS_{Ist}$ is formed from the front axle brake slip $DS_{VA}$ and the rear axle brake slip $DS_{HA}$ as follows:

$$DS_{Ist} \sim (DS_{HA} - DS_{VA})/DS_{HA} * 100\%; \quad (1.1)$$

the difference in the rotational behavior of the vehicle axles VA, HA is thus defined by a deviation of the front axle brake slip $DS_{VA}$ from the rear axle brake slip $DS_{HA}$, which is in particular increased if the rear axle HA is overbraked in contrast to the front axle VA, i.e. tends more to slip.

An alternative method of calculation of the rotational behavior of the rear wheels 1, 2 relative to the rotational behavior of the front wheels 3, 4 is to determine the actual differential slip $DS_{Ist}$ from the revolution rates $v_{VA}$ or $v_{HA}$ of the vehicle axles VA, HA, i.e.

$$DS_{Ist} \sim (v_{VA} - v_{HA})/v_{VA} * 100\%, \quad (1.2)$$

wherein the revolution rates $v_{VA}$ or $v_{HA}$ for example can result from an average value of the revolution rates of the wheels 1, 2, 3, 4 of the respective vehicle axles VA, HA.

The aforementioned two equations 1.1 and 1.2 are only used by way of example to obtain a variable characterizing the difference in the rotational behavior. However, any other dependencies can also be used.

For the differential slip control, it is provided that the VD control device 15 determines the actual differential slip $DS_{Ist}$ continuously following actuation of the brake valve 9.2 and in the presence of the target vehicle deceleration $z_{Soll}$. If the actual brake slip $DS_{Ist}$ deviates from a target brake slip $DS_{Soll}$, wherein in the case of unlocked ABS brake valves 11, 12, 13, 14 a predetermined tolerance value $DS_T$ can be incorporated, and the actual vehicle deceleration $z_{Ist}$ lies in the second region B2, then the VD control device 15 controls the ABS brake valves 11, 12, 13, 14 of the rear wheels 1, 2 so that the actual differential slip $DS_{Ist}$ again corresponds to the target differential slip $DS_{Soll}$ within the tolerance $DS_T$:

If the actual differential slip $DS_{Ist}$ lies below the target differential slip $DS_{Soll}$, the rear axle HA is underbraked in relation to the target differential slip $DS_{Soll}$ relative to the front axle VA. In this case, the ABS inlet valves 11, 13 are opened so that the rear axle braking pressure $p_{HA}$ is increased. If the actual differential slip $DS_{Ist}$ lies above the target differential slip $DS_{Soll}$, the rear axle brake slip $DS_{HA}$ in relation to the target differential slip $DS_{Soll}$ is greater than the front axle brake slip $DS_{VA}$, i.e. the rear axle HA is overbraked. In this case, the rear axle braking pressure $p_{HA}$ is limited, preferably maintained, so that the braking effect on the rear wheels 1, 2 is not increased further.

Figure 3:
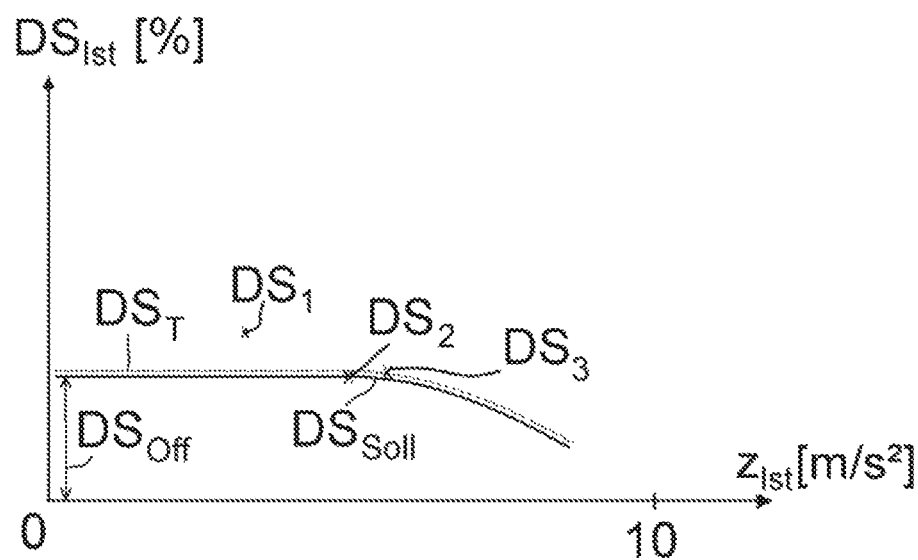
FIG. 3 shows a graph of a dependency of a target differential slip on an actual vehicle deceleration for use in differential slip control.

The target differential slip $DS_{Soll}$ to which the slip is controlled is, according to said embodiment, dependent on the actual vehicle deceleration zest, as shown in FIG. 3. For low actual vehicle decelerations $z_{Ist}$, the target differential slip $DS_{Soll}$ is initially constant and at a determined offset differential slip $DS_{Off}$. According to said embodiment, the offset differential slip $DS_{Off}$ is determined at the start of braking, i.e. when no braking forces are yet acting on the wheel brakes 5, 6, 7, 8, so that in particular the engine drag torque and the wear on the wheels 1, 2, 3, 4 are taken into account. The offset differential slip $DS_{Off}$ is positive during a calculation of the actual differential slip $DS_{Ist}$ according to the equations 1.1 or 1.2 if the rear axle HA is the axle being driven by the engine of the vehicle 100, because the rear axle HA is turning more slowly owing to the engine drag torque. Starting from the offset differential slip $DS_{Off}$, the target differential slip $DS_{Soll}$ reduces towards zero, i.e. towards synchronous wheel rotational behavior of the wheels 1, 2, 3, 4 of the first and second vehicle axles HA, VA.

If the actual differential slip $DS_{Ist}$, for example at the start of the differential slip control, lies above the target differential slip $DS_{Soll}$ and also above the tolerance $DS_T$ at the point $DS_1$, the rear axle braking pressure $p_{HA}$ is initially limited. According to said exemplary embodiment, only a tolerance $DS_T$ above the target differential slip $DS_{Soll}$ is provided. Alternatively or additionally however, a tolerance $DS_T$ below the target differential slip $DS_{Soll}$ can also be provided. If a higher target vehicle deceleration $z_{Soll}$ is demanded by the driver by further actuation of the brake valve 9.2, the vehicle 200 is additionally only still decelerated with the front wheel brakes 7, 8 if the actual vehicle deceleration $z_{Ist}$ does not exit the second region B2; the actual vehicle deceleration $z_{Ist}$ increases. As a result, the actual differential slip $DS_{Ist}$ shifts from the point $DS_1$ to the point $DS_2$, for example exactly on the $DS_{Soll}$ curve, so that the limiting of the rear axle braking pressure $p_{HA}$ is removed and the rear axle braking pressure $p_{HA}$ is increased in a pulsed manner. Owing to the additional braking effect of the rear wheel brakes 5, 6, in the further profile the braking of the point $DS_2$ now shifts towards increasing actual vehicle deceleration $z_{Ist}$ again in the direction above the $DS_{Soll}$ curve at the point $DS_3$. If the actual differential slip $DS_{Ist}$ reaches or lies slightly above the tolerance value $DS_T$, a further pressure increase on the rear wheel brakes 5, 6 is shut off, the rear axle braking pressure $p_{HA}$ is again limited and only braking of the front wheel brakes 7, 8 is active.

In the case of increasing actual vehicle deceleration $z_{Ist}$, the target differential slip $DS_{Soll}$ reduces to smaller values. As a result, the circumstance is taken into account that the rear axle HA tends to be overbraked in the case of high decelerations of the vehicle 200 and in particular a low or high load, a high center of gravity of the load and a short wheelbase, i.e. it tends more to slip, i.e. the actual differential slip $DS_{Ist}$ tends to shift to higher values during a calculation according to the equations 1.1 or 1.2. The aim of the method is thus to carry out braking force limiting on the rear axle HA for longer and to inhibit an increase in pressure for a higher deceleration to which the front axle VA contributes in the second region B2 without pressure limiting. Slipping of the rear axle HA and intervention by the higher-level ABS control that is caused as a result can be avoided and the braking is smoother and safer.

If as a result of the differential slip control or for other reasons the second region B2 is exited towards the first region B1, the differential slip control is advantageously terminated in a pulsed manner and the rear axle braking pressure $p_{HA}$ is increased.

According to one embodiment, for the case in which there is an actual differential slip $DS_{Ist}$ in the third region B3 that is greater than the target differential slip $DS_{Soll}$, i.e. the rear axle HA is overbraked, the outlet valves 12, 14 are opened so that a decrease in pressure on the rear wheel brakes 5, 6 takes place in order to reach or fall below the maximum deceleration characteristic $z_{Kmax}$ as fast as possible and to reduce the overbraking of the rear axle HA.

An electronic braking force distribution or a braking pressure distribution is caused by the differential slip control depending on the axle loads on the front axle VA and on the rear axle HA as follows:

If the vehicle 200 is not loaded, i.e. a small weight force is acting on the rear axle HA, the rear wheels 1, 2 tend to lock for the same brake actuation or for a specified target vehicle deceleration $z_{Soll}$ more than for a fully loaded vehicle 200 with greater weight on the rear axle HA. The result of this is that the rear wheels 1, 2 are pressed harder onto the ground at the high weight in the loaded state. The load has at least no significant effect on the front axle VA owing to the large weight of the engine.

The actual differential slip $DS_{Ist}$ thus varies depending on the load on the vehicle 200 for a defined target vehicle deceleration $z_{Soll}$. The differential slip controller cannot directly measure the weight force acting on the rear axle HA, but it always controls the ABS valves 11, 12, 13, 14 on the rear wheel brakes 5, 6 at the point in time at which the load-dependent actual differential slip $DS_{Ist}$ differs from the target differential slip $DS_{Soll}$ by at least the tolerance $DS_T$. Because the VD control device 15 does not control the front axle braking pressure $p_{VA}$ during differential slip control, distribution of the braking forces to the vehicle axles VA, HA depending on the load is achieved indirectly by the differential slip control. Thus, the load on the vehicle 200 can be concluded from the actual differential slip $DS_{Ist}$.

Figure 4A:
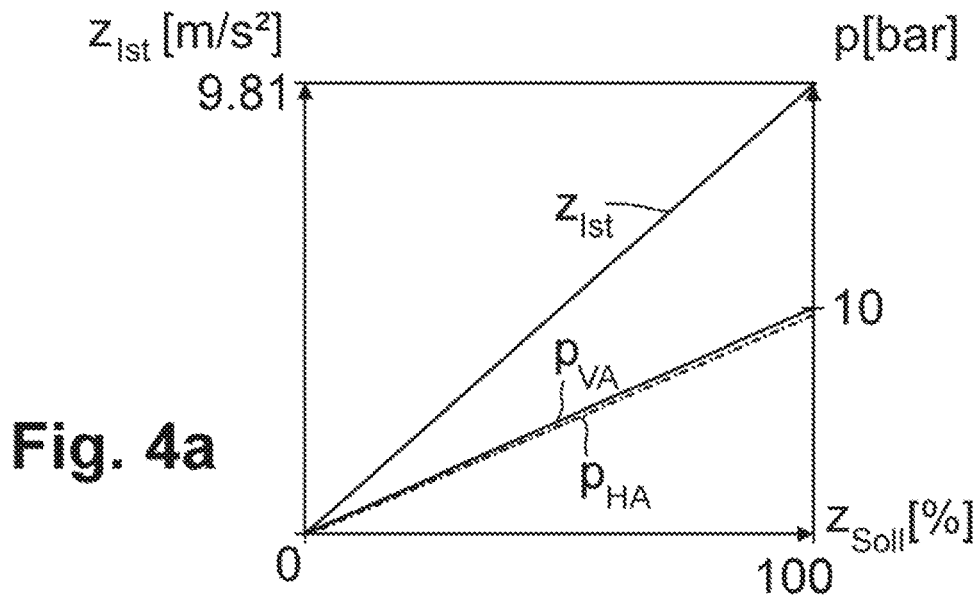
FIGS. 4a, b show a dependency of a controlled braking pressure on vehicle axles depending on a load.
Figure 4B:
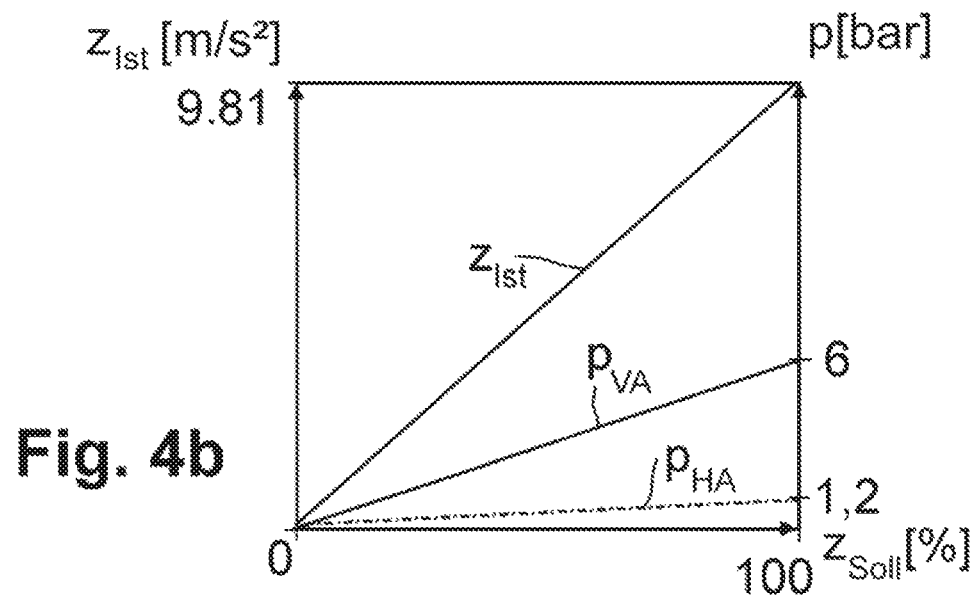

This can result in the situations shown in FIGS. 4a and 4b for different loads: If the vehicle 200 is fully loaded, then the braking force is distributed approximately uniformly to the two vehicle axles HA, VA, as represented in the exemplary embodiment of FIG. 4a. I.e., depending on the target vehicle deceleration $z_{Soll}$, the front and rear wheel brakes 5, 6, 7, 8 are subjected to about the same braking pressure $p_{VA}$, $p_{HA}$ to cause an actual vehicle deceleration $z_{Ist}$, which for $z_{Soll}$=100% for example corresponds to $z_{Ist}$=1 g (g=9.81 m/s$^2$) if the front and rear wheel brakes 5, 6, 7, 8 are each subjected to a braking pressure of $p_{VA}$=$p_{HA}$=10 bar.

If the vehicle 200 is less than fully loaded, for example is not loaded, as represented in the exemplary embodiment in FIG. 4b, and has a mass in the unladen state that is approx. a third of the mass of the fully loaded vehicle 200, as shown in FIG. 4b a greater part of the braking is effected by the front wheel brakes 7, 8. In this example, for a target vehicle deceleration $z_{Soll}$ of 100% (corresponds to 1 g with g=9.81 m/s$^2$ according to the above example), a front axle braking pressure $p_{VA}$ of 6 bar and a rear axle braking pressure $p_{HA}$ of only 1.2 bar are set in order to achieve an actual vehicle deceleration $z_{Ist}$ of 100% corresponding to the target vehicle deceleration $z_{Soll}$ as in FIG. 4a for the fully loaded state. The front axle VA is slowed less and the rear axle HA is slowed considerably less, whereby premature locking at low load of the front axle VA and in particular of the rear axle HA can be avoided.

The maximum deceleration characteristic curve $z_{Kmax}$ and the minimum deceleration characteristic curve $z_{Kmin}$ can be stored in the VD control device 15, wherein at least the maximum deceleration characteristic curve $z_{Kmax}$ can vary depending on the load. In this case, the maximum deceleration characteristic curve $z_{Kmax}$ shifts as indicated in dashed form in FIG. 2 to higher actual vehicle decelerations $z_{Ist}$, so that the third region B3 is reduced. I.e., for a certain target vehicle deceleration $z_{Soll}$, the front axle braking pressure $p_{VA}$ is first maintained at a higher actual vehicle deceleration $z_{Ist}$. The rear axle braking pressure $p_{HA}$, which can be matched to the front axle braking pressure $p_{VA}$ by the differential slip control according to slip difference criteria, also increases as a result at a defined target vehicle deceleration $z_{Soll}$. The vehicle 200 is thus decelerated more in the unladen state for the same target vehicle deceleration $z_{Soll}$ than in the loaded state. Thus, the driver can be notified of the load state owing to the shift of the maximum deceleration characteristic curve $z_{Kmax}$, so that the driver can react accordingly.

For measuring the load state, an ECAS system can be provided that controls the pneumatic suspension of the vehicle 200 electronically and for this purpose comprises a displacement sensor that is not shown that measures the displacement between the rear axle HA and a reference point on the vehicle 200 depending on the load. Furthermore, a mechanical-electronic axle load-dependent braking pressure distributor (ALB) can also produce the value of the load that is also controlled by a displacement sensor or a pressure sensor. Both systems, i.e. ECAS and ALB, can for example transmit the load state detected by said systems via the CAN bus to the VD control device 15, which selects the maximum deceleration characteristic curve $z_{Kmax}$ depending thereon.

It is however also possible that the VD control device 15 determines the load state itself. For this purpose, the load can be determined using the measured actual differential slip $DS_{Ist}$ as described above and the load state can be determined therefrom. Alternatively, a further displacement sensor can also be disposed in the vehicle 200 between a frame that is fixed relative to the vehicle and the vehicle axles HA, VA, the load-dependent displacement of which can be detected by the VD control device 15. The load on the vehicle can be concluded from the displacement.

Alternatively, engine performance data and vehicle acceleration data can be transmitted by an engine control unit that is not shown via the CAN bus, from which the VD control device 15 can conclude a mass of the vehicle 200 and hence an additional load compared to an empty weight of the vehicle 200. During this, it can also be taken into account whether a trailer is coupled to the vehicle 200, which can be proportionately allotted to the determined mass of the vehicle 200 and which can additionally influence the driving behavior at the rear axle HA. Said information can be transmitted via the CAN bus by a trailer control device. Furthermore, the behavior of a drive slip controller can be taken into account, from which a load state can also be determined.

Figure 5:
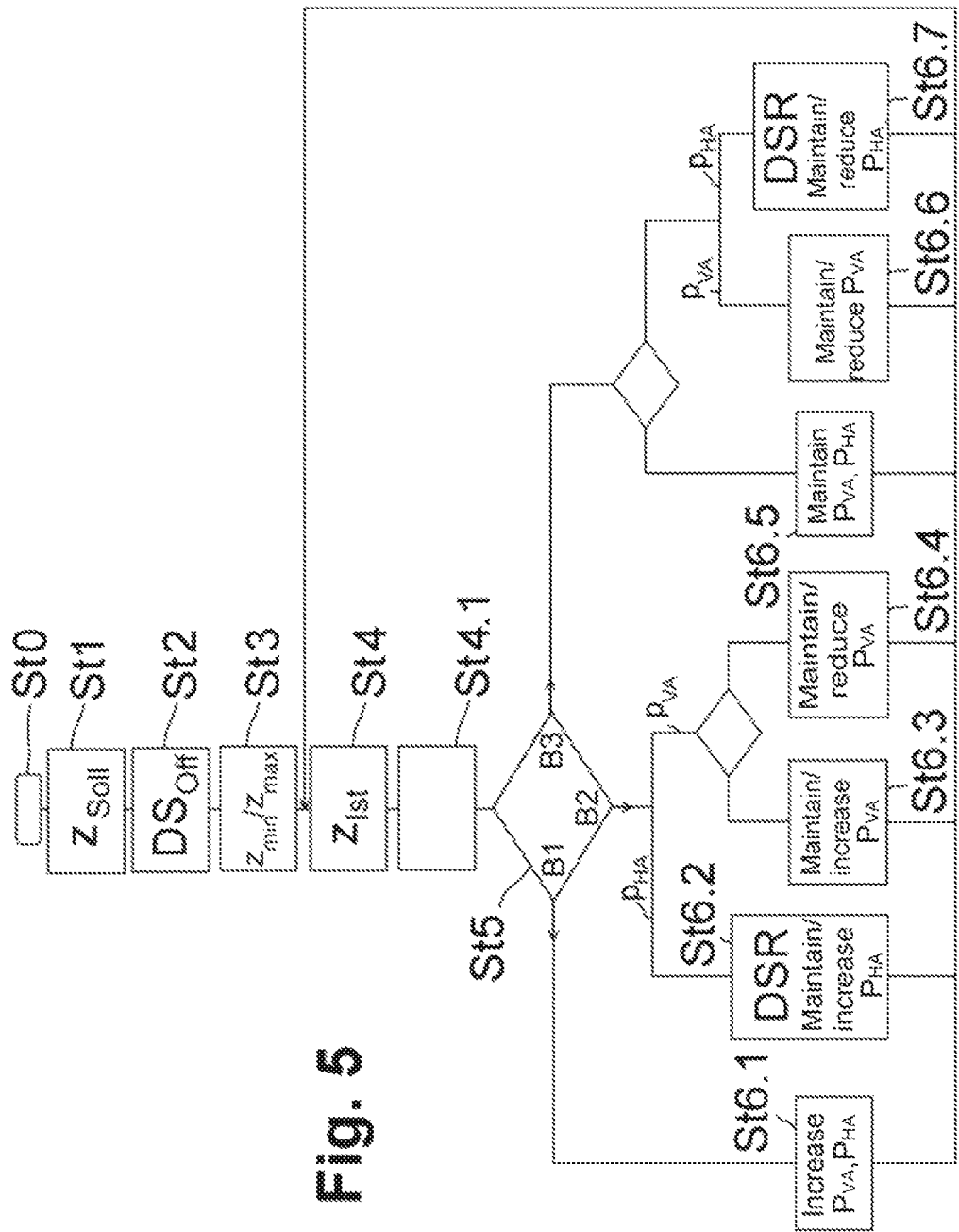
FIG. 5 shows a flow chart for carrying out an electronic vehicle deceleration control according to an embodiment of the invention.

A method according to an embodiment of the invention for electronic braking pressure control can be carried out according to FIG. 5 as follows. In a step St0, the braking is started, for example by actuation of the brake valve 9.2 by the driver. In a first step St1, the target vehicle deceleration $z_{Soll}$ is detected with the braking value transducer 9.3 depending on the actuation of the brake valve 9.2, wherein either an actuation travel of the brake valve 9.2 or a rear axle or front axle braking pressure $p_{HA}$, $p_{VA}$ controlled by actuation of the brake valve 9.2 is detected.

In a second step St2, at the start of braking, i.e. when there are still no braking forces acting, an offset differential slip $DS_{Off}$ is determined. Said offset differential slip $DS_{Off}$ can differ from zero owing to an engine drag torque or wear on the wheels 1, 2, 3, 4 and hence varying wheel circumferences.

In a third step St3, depending on the load on the vehicle 200, a stored maximum deceleration characteristic curve $z_{Kmax}$ is selected. Furthermore, a minimum deceleration characteristic curve $z_{Kmin}$ is also determined. For the detected target vehicle deceleration $z_{Soll}$, values for the maximum deceleration $z_{max}$ and the minimum deceleration $z_{min}$, on which the subsequent electronic vehicle deceleration control is based, thus result from the characteristic curves $z_{Kmax}$, $z_{Kmin}$.

In a fourth step St4, the actual vehicle deceleration $z_{Ist}$ is detected. This results for example from an acceleration sensor that is not shown or from the derivative of a determined vehicle reference speed $v_{ref}$ which can be determined for example from an average value of the revolution rates of the wheels 1, 2, 3, 4. Furthermore, in a step St4.1 it is determined whether a braking process or a slowing down process is occurring, i.e. whether the actual vehicle deceleration $z_{Ist}$ is increasing or decreasing and whether the driver has demanded this by increasing or reducing the target vehicle deceleration $z_{Soll}$.

In a fifth step St5, the actual vehicle deceleration $z_{Ist}$ defined in the fourth step St4 by the VD control device 15 as a function of the target vehicle deceleration $z_{Soll}$ is assigned to a region B1, B2, B3 of the graph according to FIG. 2, or a comparison is made as to whether the actual vehicle deceleration $z_{Ist}$ is greater than or less than the maximum deceleration $z_{max}$ or the minimum deceleration $z_{min}$.

If the actual vehicle deceleration $z_{Ist}$ lies in the first region B1, i.e. if it is less than the minimum deceleration $z_{min}$, in a subsequent step St6.1 the inlet valves 11, 13, 21, 23 of the rear and front wheel brakes 5, 6, 7, 8 are opened and the outlet valves 12, 14, 22, 24 are closed, so that both the rear axle braking pressure $p_{HA}$ and also the front axle braking pressure $p_{VA}$ are increased.

If the actual vehicle deceleration $z_{Ist}$ lies in the second region B2, i.e. if it is less than the maximum deceleration $z_{max}$ and greater than the minimum deceleration $z_{min}$, in a step St6.2 the inlet valves 11, 13 of the rear wheel brakes 5,

6 are actuated depending on the actual differential slip $DS_{Ist}$ that is preferably determined during the entire braking process by the VD control device 15, such that the actual differential slip $DS_{Ist}$ corresponds to the target differential slip $DS_{Soll}$ that is stored in the VD control device 15 to within the tolerance $DS_T$, which at least at the start of braking is the same as the offset differential slip $DS_{Off}$ determined in the second step St2 and which can vary during braking as a function of the acceleration of the vehicle. In this case, the rear axle braking pressure $p_{HA}$ can either be maintained or increased. According to one embodiment, a pressure reduction can also be provided in the second region B2 by the differential slip control by actuating the outlet valves 12, 14 of the rear wheel brakes 5, 6.

The inlet valves 21, 23 and the outlet valves 22, 24 of the front wheel brakes 7, 8 are controlled in the second and in the third region B2, B3 preferably depending on whether a braking process or a slowing down process was detected in the step St4.1, wherein the front axle braking pressure $p_{VA}$ in the case of a braking process in the second region B2 is maintained or increased in a step St6.3, and is maintained in the third region B3 according to a step St6.5, and is limited in the case of a slowing down process in the second and in the third region B2, B3, i.e. maintained or reduced (steps St6.4 and St6.6), depending on whether the target vehicle deceleration $z_{Soll}$ has already been reached or not.

The inlet valves 11, 13 and the outlet valves 12, 14 of the rear wheel brakes 5, 6 are also controlled in the third region B3 depending on whether a braking process or a slowing down process is occurring, wherein the rear axle braking pressure $p_{HA}$ is maintained during a braking process according to step St6.5 and during a slowing down process according to step St6.7 is limited, i.e. maintained or reduced, depending on whether the target differential slip $DS_{Soll}$ has already been reached or not, wherein the rear axle braking pressure $p_{HA}$ is reduced in the case of an actual differential slip $DS_{Ist}$ that is greater than the target differential slip $DS_{Soll}$, i.e. in the case of relative overbraking.

Following the steps St6.1, St6.2, St6.3, St6.4, St6.5, St6.6 or St6.7, the electronic vehicle deceleration control starts again within a braking process with the fourth step St4. Thus, in the case of continuous braking, the detected actual vehicle deceleration $z_{Ist}$ is associated with a region B1, B2, B3 and the rear axle braking pressure $p_{HA}$ and the front axle braking pressure $p_{VA}$ are adjusted accordingly.

Figure 6:
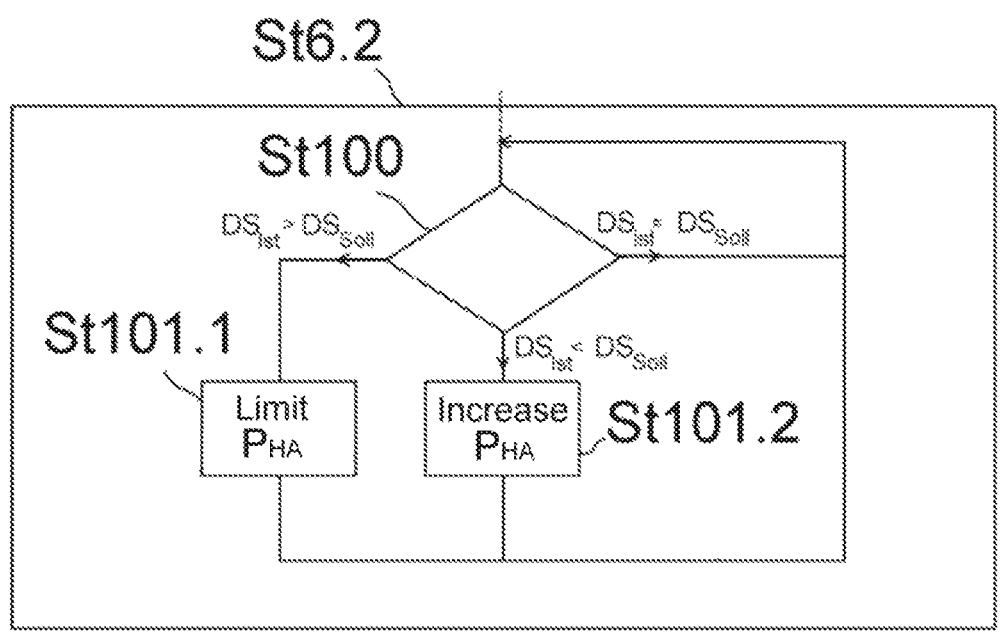
FIG. 6 shows a flow chart for carrying out a differential slip control as part of the electronic vehicle deceleration control according to FIG. 5.

The differential slip control in the step St6.2 proceeds according to FIG. 6 as follows: In a step St100, the actual differential slip $DS_{Ist}$ is compared with the target differential slip $DS_{Soll}$, which is stored in the VD control device 15 as represented in FIG. 3 and with which the offset differential slip $DS_{Off}$ determined in step St2 of the vehicle deceleration control is taken into account.

If the actual differential slip $DS_{Ist}$ is greater than the target differential slip $DS_{Soll}$, the rear axle HA is overbraked relative to the front axle VA. If the actual differential slip $DS_{Ist}$ is above the tolerance $DS_T$ in this case, the VD control device 15 causes limiting of the rear axle braking pressure $p_{HA}$ in a step St101.1, so that the braking force of the wheel brakes 5, 6 on the rear axle HA is not increased further. If the actual differential slip $DS_{Ist}$ is less than the target differential slip $DS_{Soll}$ or less than the tolerance $DS_T$, an increase of the rear axle braking pressure $p_{HA}$ is demanded by the VD control device 15 in a step St101.2, because the rear axle HA is underbraked relative to the front axle VA. If the actual differential slip $DS_{Ist}$ equals the target differential slip $DS_{Soll}$ within the tolerance $DS_T$, the method starts from the beginning; the tendency to locking of the rear axle HA has been adapted to the tendency to locking of the front axle VA.

Figure 7A:
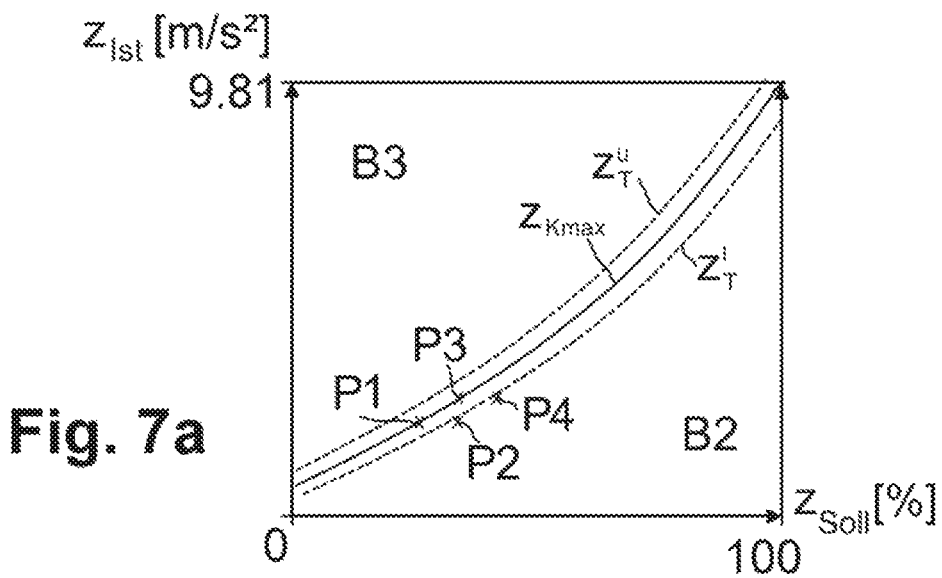
FIGS. 7a, b show a profile of an actual vehicle deceleration when carrying out the vehicle deceleration control during a braking process and during a slowing down process of the vehicle.
Figure 7B:
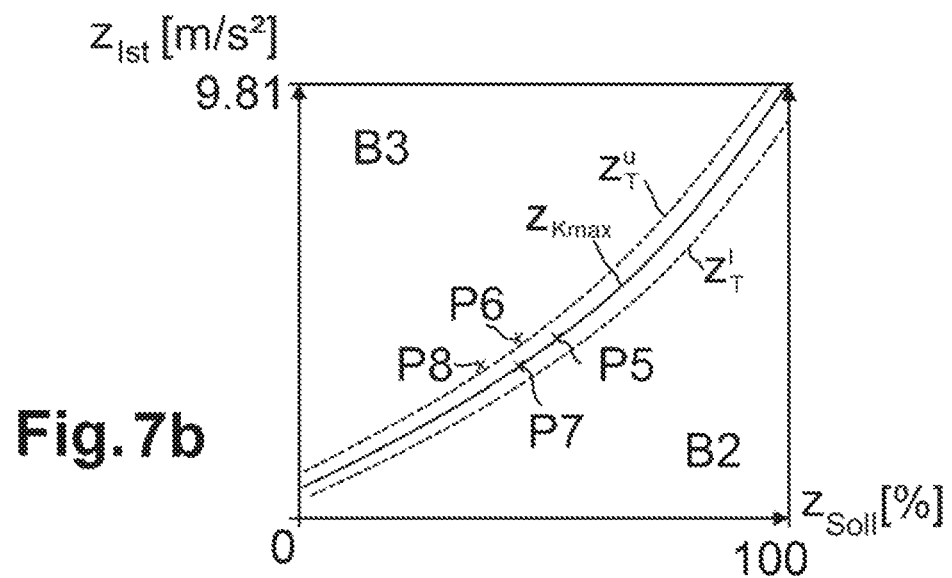

FIGS. 7a and 7b show by way of example a maximum deceleration characteristic curve $z_{Kmax}$ with an upper tolerance $z^u{}_T$ and a lower tolerance $z^l{}_T$ for a braking process (FIG. 7a) and a slowing down process (FIG. 7b). It is started at point P1, which corresponds to a braking situation, in which the driver specifies a target vehicle deceleration $z_{Soll}$. At point P1 the maximum deceleration characteristic curve $z_{Kmax}$ is reached, i.e. both the rear axle braking pressure $p_{HA}$ and also the front axle braking pressure $p_{VA}$ are limited by the vehicle deceleration control, preferably maintained, by shutting off the inlet valves 11, 13, 21, 23 and the outlet valves 12, 14, 22, 24 independently of the detected actual differential slip $DS_{Ist}$, the actual vehicle deceleration $z_{Ist}$ lies in the third region B3.

If the driver operates the brake pedal harder, the braking situation shifts from point P1 to point P2, wherein the actual vehicle deceleration $z_{Ist}$ is below the lower tolerance $z^l{}_T$; the actual vehicle deceleration $z_{Ist}$ lies in the second region B2. Because this is a braking process, the front axle braking pressure $p_{VA}$ in said second region B2 is either maintained or increased, depending on whether the target vehicle deceleration $z_{Soll}$ has already been reached. The rear axle braking pressure $p_{HA}$ is controlled as a function of the detected actual differential slip $DS_{Ist}$. If the actual differential slip $DS_{Ist}$ lies above the target differential slip $DS_{Soll}$, the rear axle HA is overbraked relative to the front axle VA, so that the rear axle braking pressure $p_{HA}$ is maintained and the front axle braking pressure $p_{VA}$ is increased. If the actual differential slip $DS_{Ist}$ shifts to below the target differential slip $DS_{Soll}$, the rear axle HA is underbraked and an increase of the rear axle braking pressure $p_{HA}$ is demanded. If on reaching the point P2 the actual differential slip $DS_{Ist}$ is already less than the target differential slip $DS_{Soll}$, both the rear axle braking pressure $p_{HA}$ and also the front axle braking pressure $p_{VA}$ are increased.

By said measures, the vehicle 200 is decelerated in such a way that the point P3 is reached, which lies on the maximum deceleration characteristic curve $z_{Kmax}$, so that both the rear axle braking pressure $p_{HA}$ and also the front axle braking pressure $p_{VA}$ are again limited. In the case of a further increase of the actuation of the brake pedal, point P4 is reached, at which the method is repeated as at point P2.

If the driver releases the brake pedal slightly at the point P5, for example after a braking process, then the braking situation shifts according to FIG. 7b to point P6, which lies above the upper tolerance $z^u{}_T$, i.e. an increase of the front axle braking pressure $p_{VA}$ and the rear axle braking pressure $p_{HA}$ is not enabled. If the detected actual differential slip $DS_{Ist}$ at said point P6 is less than the target differential slip $DS_{Soll}$, the rear axle braking pressure $p_{HA}$ is initially maintained and the front axle braking pressure $p_{VA}$ is reduced according to the target vehicle deceleration $z_{Soll}$ specified by the driver, in order to compensate the underbraking of the rear axle HA relative to the front axle VA. If the actual differential slip $DS_{Ist}$ at the point P6 is greater than the target differential slip $DS_{Soll}$, both the front axle braking pressure $p_{VA}$ and also the rear axle braking pressure $p_{HA}$ are reduced, in order to correspond to the driver's wishes, until the actual differential slip $DS_{Ist}$ again corresponds to the target differential slip $DS_{Soll}$ within the tolerance $D_T$.

By said measures, the braking situation shifts from point P6 to point P7, at which to reach the point P8 the measures described above are repeated if the driver releases the brake pedal further, i.e. the target vehicle deceleration $z_{Soll}$ itself is actively reduced.

In the case of a change from a braking process to a slowing down process, to reduce pressure a longer actuation time of the outlet valves 12, 14, 22, 24 can be selected once, and in the case of a change from a slowing down process to a braking process, to increase pressure a longer actuation time of the inlet valves 11, 13, 21, 23 can be selected once in order to overcome hysteresis behavior during the reversal of the braking actions of a brake.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1, 2 rear wheels
3, 4 front wheels
5, 6 rear wheel brakes
7, 8 front wheel brakes
9.1 brake cylinder
9.2 dual circuit brake valve
9.3 pressure sensor/braking value transducer
10 ABS control device
11, 13 ABS inlet valves of rear wheel brakes 5, 6
12, 14 ABS outlet valves of rear wheel brakes 5, 6
15 VD control device
21, 23 ABS inlet valves of front wheel brakes 7, 8
22, 24 ABS outlet valves of front wheel brakes 7, 8
100 brake system
101 EBS control device
200 vehicle
B1, B2, B3 first, second and third regions
DSR differential slip control
$DS_{Ist}$ actual differential slip
$DS_{Soll}$ target brake slip
$DS_{Off}$ offset differential slip
$DS_{HA}$ rear axle brake slip
$DS_{VA}$ front axle brake slip
$DS_T$ tolerance value of differential slip
HA rear axle
p brake pressure
$p_{VA}$ front axle brake pressure
$p_{HA}$ rear axle brake pressure
VA front axle
$v_{VA}$ rotation rate of front axle VA
$v_{HA}$ rotation rate of rear axle HA
$z_{Kmax}$ maximum deceleration characteristic curve
$z_{Kmin}$ minimum deceleration characteristic curve
$z_{max}$ maximum deceleration
$z_{min}$ minimum deceleration
$z_{Soll}$ target vehicle deceleration
$z_{Ist}$ actual vehicle deceleration
$z^u_T$ upper tolerance (vehicle deceleration)
$z^l_T$ lower tolerance (vehicle deceleration)

The invention claimed is:

1. A method for controlling a vehicle deceleration in a vehicle with an ABS brake system, the method comprising:
   detecting a target vehicle deceleration specified by a driver;
   defining a maximum deceleration and a minimum deceleration, each depending on the detected target vehicle deceleration;
   detecting an actual vehicle deceleration; and
   controlling a braking pressure on wheel brakes of a first vehicle axle and a second vehicle axle depending on the detected actual vehicle deceleration by actuation of ABS brake valves, wherein controlling the braking pressure by the actuation of the ABS brake valves comprises:
   increasing the braking pressure on the wheel brakes of the first vehicle axle and the second vehicle axles if the actual vehicle deceleration is less than the minimum deceleration in order to achieve a minimum braking effect,
   limiting the braking pressure on the wheel brakes of the first vehicle axle and the and the second vehicle axles if the actual vehicle deceleration is greater than the maximum deceleration in order to limit a braking effect, and
   additionally controlling the braking pressure on the wheel brakes of the second vehicle axle depending on a detected actual differential slip if the actual vehicle deceleration is less than the maximum deceleration and greater than the minimum deceleration, wherein the actual differential slip indicates the difference in a rotational behavior of the first vehicle axle with respect to the second vehicle axle.

2. The method as claimed in claim 1, wherein the maximum deceleration is specified using a maximum deceleration characteristic curve which represents a dependency of the maximum deceleration on the target vehicle deceleration, and wherein the minimum deceleration is specified using a minimum deceleration characteristic curve which represents a dependency of the minimum deceleration on the target vehicle deceleration.

3. The method as claimed in claim 2, wherein the maximum deceleration characteristic curve is dependent on a load on the vehicle.

4. The method as claimed in claim 3, wherein the load on the vehicle is measured with an axle load sensor or is derived from the detected actual differential slip.

5. The method as claimed in claim 3, wherein the maximum deceleration characteristic curve rises more steeply for a small load, so that the braking pressure is limited for a small load on the vehicle for higher detected actual vehicle decelerations in contrast to a large load on the vehicle.

6. The method as claimed in claim 2, wherein the maximum deceleration characteristic curve has a harmonic profile without steps for limiting the braking pressure without decelerating the vehicle in a jerky manner.

7. The method as claimed in claim 1, wherein the braking pressure on the wheel brakes of the first vehicle axle is maintained or increased during a braking process, and is maintained or reduced during a slowing down process, if the actual vehicle deceleration is less than the maximum deceleration and greater than the minimum deceleration, and wherein the braking pressure on the wheel brakes of the first vehicle axle is maintained or reduced during a slowing down process if the actual vehicle deceleration is greater than the maximum deceleration.

8. The method as claimed in claim 7, wherein the braking pressure on the wheel brakes of the first vehicle axle is additionally reduced during a braking process if the resulting actual vehicle deceleration is greater than the target vehicle deceleration, and wherein the braking pressure on the wheel brakes of the first vehicle axle is additionally increased during a slowing down process if the resulting actual vehicle deceleration is less than the target vehicle deceleration.

9. The method as claimed in claim 1, wherein the actual differential slip is calculated from a difference of a determined rear axle brake slip minus a determined front axle brake slip normalized to the rear axle brake slip, or from a difference of a determined axle speed of the front axle minus a determined axle speed of the rear axle normalized to the axle speed of the front axle, wherein the rear axle is the vehicle axle that is driven by an engine.

10. The method as claimed in claim 1, wherein the braking pressure on the wheel brakes of the second vehicle axle is controlled as a function of the actual differential slip in such a way that the actual differential slip corresponds to a target differential slip, wherein the braking pressure on the wheel brakes of the second vehicle axle is for this purpose limited if the second vehicle axle is overbraked relative to the first vehicle axle and increased if the second vehicle axle is underbraked relative to the first vehicle axle.

11. The method as claimed in claim 10, wherein the target differential slip is dependent on the detected actual vehicle deceleration or the target vehicle deceleration, wherein the target differential slip is reduced in the direction of a synchronous wheel rotational behavior of the wheels of the first vehicle axle and of the second vehicle axle in the case of an increasing actual vehicle deceleration or increasing target vehicle deceleration, so that the braking pressure on the second vehicle axle is already limited in the case of low relative overbraking.

12. The method as claimed in claim 1, wherein the braking pressure on the wheel brakes of the second vehicle axle is reduced depending on the actual differential slip if the actual vehicle deceleration is greater than the maximum deceleration and the second vehicle axle is overbraked relative to the first vehicle axle.

13. The method as claimed in claim 10, wherein if the second vehicle axle is the rear axle, the braking pressure on rear wheel brakes is limited if the actual differential slip is greater than the target differential slip and is increased if the actual differential slip is less than the target differential slip, and
wherein if the second vehicle axle is the front axle, the braking pressure on the front wheel brakes is limited if the actual differential slip is less than the target differential slip and is increased if the actual differential slip is greater than the target differential slip.

14. The method as claimed in claim 1, wherein the second vehicle axle is a rear axle of the vehicle and the first vehicle axle is a front axle of the vehicle.

15. The method as claimed in claim 1, wherein in the case of limiting of the braking pressure on the wheel brakes of the first or the second vehicle axle, the braking pressure is only maintained or reduced and is not increased.

16. A device for electronically controlling a vehicle deceleration in a vehicle with an ABS brake system, wherein the device is configured to:
select a maximum deceleration and a minimum deceleration depending on a detected target vehicle deceleration, and
actuate ABS brake valves on wheel brakes of a first vehicle axle and of a second vehicle axle depending on a detected actual vehicle deceleration in such a way that
increasing the braking pressure on the wheel brakes of the first vehicle axle and the second vehicle axles if the actual vehicle deceleration is less than the minimum deceleration in order to achieve a minimum braking effect,
limiting the braking pressure on the wheel brakes of the first vehicle axle and the and the second vehicle axles if the actual vehicle deceleration is greater than the maximum deceleration in order to limit a braking effect, and
additionally controlling the braking pressure on the wheel brakes of the second vehicle axle depending on a detected actual differential slip if the actual vehicle deceleration is less than the maximum deceleration and greater than the minimum deceleration, wherein the actual differential slip indicates the difference in a rotational behavior of the first vehicle axle with respect to the second vehicle axle.

17. The device as claimed in claim 16, wherein the second vehicle axle is a rear axle and the first vehicle axle is a front axle of the vehicle.

18. A vehicle with a brake system, the brake system comprising:
a brake valve for controlling a braking pressure on wheel brakes of the vehicle,
a braking value transducer for detecting a target vehicle,
a sensor for detecting an actual vehicle deceleration,
ABS brake valves, and
a device configured to:
select a maximum deceleration and a minimum deceleration depending on a detected target vehicle deceleration, and
actuate ABS brake valves on wheel brakes of a first vehicle axle and of a second vehicle axle depending on a detected actual vehicle deceleration in such a way that
increasing the braking pressure on the wheel brakes of the first vehicle axle and the second vehicle axle if the actual vehicle deceleration is less than the minimum deceleration in order to achieve a minimum braking effect,
limiting the braking pressure on the wheel brakes of the first vehicle axle and the and the second vehicle axle if the actual vehicle deceleration is greater than the maximum deceleration in order to limit a braking effect, and
additionally controlling the braking pressure on the wheel brakes of the second vehicle axle depending on a detected actual differential slip if the actual vehicle deceleration is less than the maximum deceleration and greater than the minimum deceleration, wherein the actual differential slip indicates the difference in a rotational behavior of the first vehicle axle with respect to the second vehicle axle.

* * * * *